Dec. 30, 1952  G. E. ROWE  2,623,649
MEANS FOR HANDLING ARTICLES
Filed April 2, 1947  7 Sheets-Sheet 1

Fig.1

INVENTOR
GEORGE E. ROWE
BY Parham Bates
ATTORNEYS Dec. 30, 1952 G. E. ROWE 2,623,649
MEANS FOR HANDLING ARTICLES
Filed April 2, 1947 7 Sheets-Sheet 2

INVENTOR
GEORGE E. ROWE
BY Parham & Bates
ATTORNEYS

Dec. 30, 1952    G. E. ROWE    2,623,649
MEANS FOR HANDLING ARTICLES
Filed April 2, 1947    7 Sheets-Sheet 5

INVENTOR
GEORGE E. ROWE
BY Parham + Bates
ATTORNEYS

Patented Dec. 30, 1952

2,623,649

UNITED STATES PATENT OFFICE 2,623,649

MEANS FOR HANDLING ARTICLES

George E. Rowe, Wethersfield, Conn., assignor to Emhart Manufacturing Company, a corporation of Delaware Application April 2, 1947, Serial No. 738,951

7 Claims. (Cl. 214—1)

This invention relates to devices for handling articles especially those whereby a plurality of articles may be transferred simultaneously from a receiving station to a delivery station. The present invention relates more particularly to a means for transferring glass containers from a moving conveyor to the moving belt of an associated glassware machine, such as a lehr.

It is an object of the present invention to provide an article-handling device having transfer means to which movements may be imparted corresponding to the movements of articles arriving at a receiving station so that little relative motion exists between the articles and transfer means at the time the articles are engaged thereby. It is also within the contemplation of the present invention to impart such corresponding movements to the transfer means in such a manner that interference between the transfer means and articles arriving at the receiving station subsequent to the engagement of the transfer means with the articles which arrived previously at the receiving station, is avoided.

Another object of the present invention is to provide a handling device of the character described capable of grasping securely and transferring a plurality of articles having portions to be gripped which may vary in size within limits among themselves and also may be out of transverse alignment at the receiving station to a limited degree.

A still further object of the present invention is to provide a device of the character described having gripper members adapted to grasp a plurality of articles, having portions to be gripped which may vary in size within limits among themselves, without damaging the articles and without placing any of them under undue pressure.

Another object of the present device is the provision of a means for engaging articles and bodily transferring them from one moving surface to another moving surface without subjecting the articles to undesirable impacts or accelerations.

A further object of the present invention is the provision of a control means for regulating the operation of a device of the character described in such a manner that an integral number of articles is engaged at the receiving station by the transfer means, even though the number of articles handled may vary over a wide range and the spacing between consecutive articles may vary greatly.

With such objects in view, as well as other advantages which may be incident to the use of the disclosed device, my invention will be described with particular reference to the accompanying drawings which show means for carrying the same into practical effect. The structure shown is only one of many possible embodiments, and the application of my invention should not be understood as limited to the particular construction which, for the purpose of explanation, has been made the subject of illustration.

Figure 1:
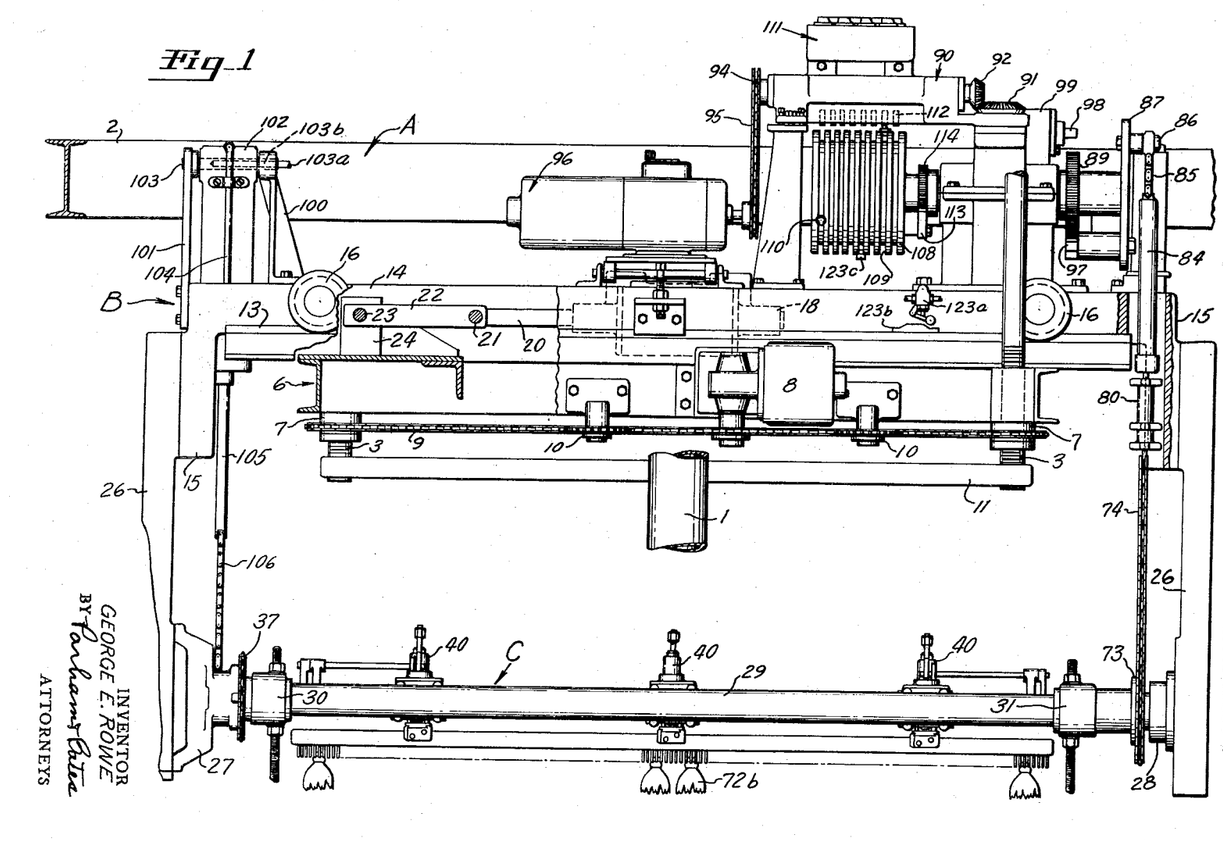
Fig. 1 is an elevation view of a preferred embodiment of the present invention, showing certain details of a movable carriage and transfer means which are component parts thereof, certain parts being broken away and others being omitted from the view in order to facilitate a clear presentation of the parts shown.
Figure 2:
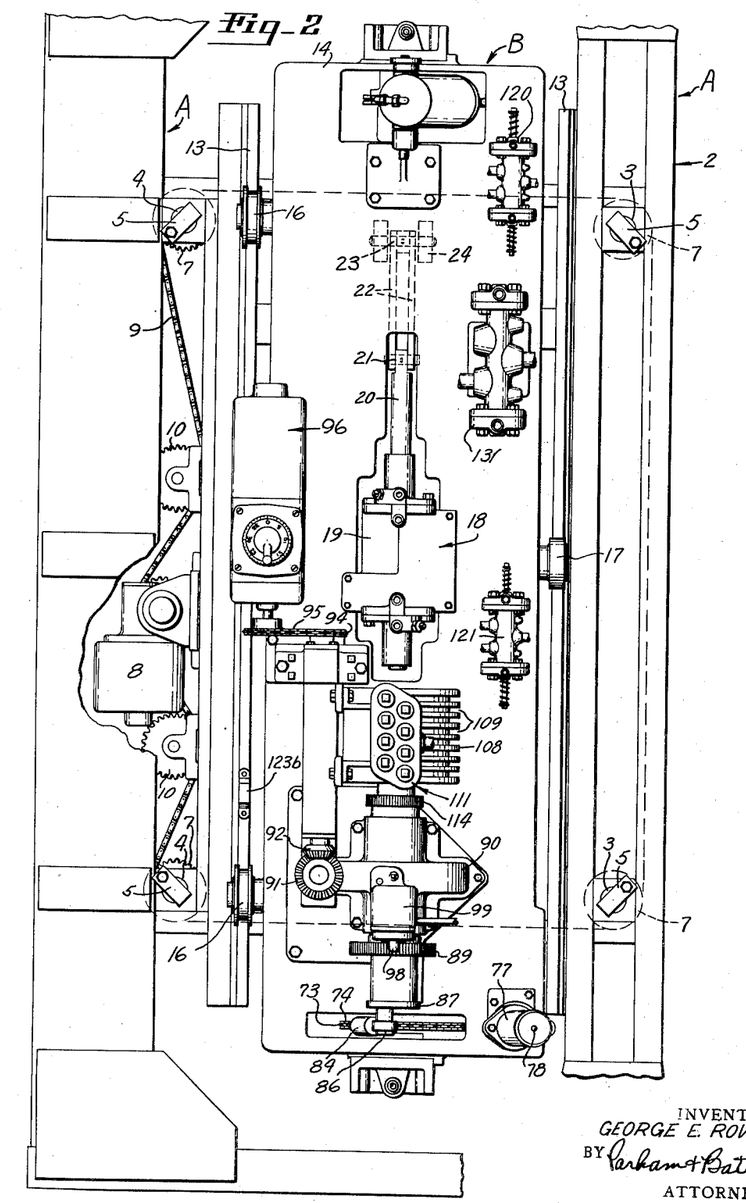
Fig. 2 is a plan view of the device, certain structural support members and certain details of the piping arrangement being omitted for purposes of clarity.
Figure 3:
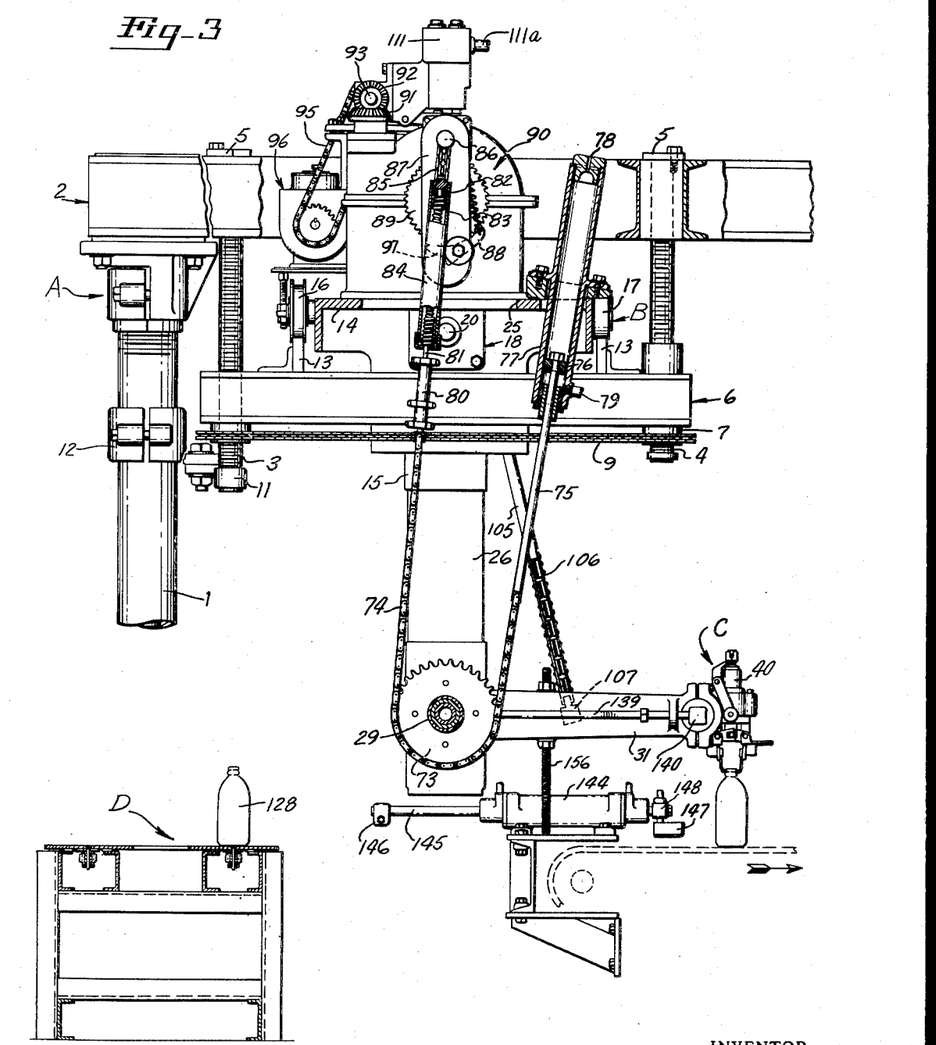
Fig. 3 is an end view of the preferred embodiment, showing certain actuating means operatively associated with pivoted transfer means for transferring glass containers from a receiving station to a delivery station.

In a general sense, the present device comprises a stationary supporting structure, generally designated A, Figs. 1 and 2, which adjustably supports a movable carriage, generally designated B, Figs. 1, 2 and 3. Carriage B has a pair of depending rigid members to which transfer means, generally designated C, Figs. 1 and 3, are pivotally secured for controlled movements whereby containers may be transferred from a receiving station D to a delivery station E. See Fig. 3.

General Construction of the supporting structure

Referring to Figs. 1, 2 and 3, the supporting structure A of the present device comprises stationary vertical columns, one of which is shown at 1 (Fig. 3), upon which is mounted a rigid framework of structural members, generally designated 2.

Two pairs of threaded supporting rods 3 and 4, respectively, Fig. 2, depend from this rigid framework as indicated by the showing in Fig. 3 of one rod of each pair. Rods 3 and 4 may be secured to framework 2 by conventional fastening means, as at 5, and, in conjunction with mechanism to be described presently, support and permit the adjustment of vertical position of a cradle, generally designated 6. Cradle 6 may be in the form of a rectangular box-like structure, as shown in Figs. 1 and 3. Each threaded rod depends through a portion of the cradle and is provided with a sprocket 7 upon which the cradle rests, each sprocket having an internally threaded aperture to engage the threads of the associated rod. An electric elevating motor 8 is mounted on one side of cradle 6 and drives a continuous roller chain 9 which engages each of the sprockets 7 and drives them in unison to raise or lower the cradle as desired (see Fig. 2). Fixed idler sprockets 10 may be provided as desired. A fixed horizontal bar 11 is secured to and braces the lower ends of rods 3, Fig. 1. A clamp bracket 12, Fig. 3, is secured to the bar and also to one of the support columns to lend additional rigidity to the structure. Two parallel, longitudinal rails 13 are provided on the upper surface of cradle 6 for a purpose to be described presently.

Details of the movable carriage

Movable carriage B comprises a table 14 which, in the present embodiment, is a more-or-less rectangular member having depending end projections 15 formed integrally therewith. See Figs. 1 and 3. A pair of flanged rollers 16, Figs. 1 and 2, are attached to the left side face of carriage 14 (Fig. 3), the flanges straddling and guiding on the left longitudinal rail 13. A plain roller 17 is rotatably secured to the right side face of the carriage 14 and runs on the upper surface of the right guide rail 13.

Longitudinal movements are imparted to the carriage by a fluid pressure motor, generally designated 18. Motor 18 comprises a cylinder 19 attached to carriage 14 and movable therewith. A conventional piston (not shown) is slidably retained within cylinder 19 and operates a piston rod 20 which projects from both ends of cylinder 19. One end of the piston rod is pivotally secured at 21 to a pair of connecting links 22 which, in turn, are pivotally secured at 23 to a stanchion 24, which is fixed to cradle 6. As shown in Fig. 2, an aperture 25 is provided in table 14. Cylinder 19 is positioned within the aperture in such a way that piston rod 20 is horizontally disposed beneath the lower surface of table 14. See Fig. 3. Compressed air or other fluid under pressure may be admitted to either end of cylinder 19 to thereby impart opposed longitudinal movements to the carriage, as may be desired. In the structure disclosed, the cylinder moves relative to the supporting structure while the piston rod and associated connecting links remain stationary relative thereto. By the use of conventional means such as check valves and vent holes, it is possible to trap and gradually release air from the actuating cylinder in such a way as to cushion the movement of the carriage as it approaches the extreme of its travel in either direction. Inasmuch as this type of structure is widely known in the art, it is not considered necessary to describe further the details for effecting this cushioning action.

As is shown in Fig. 1, various control and actuating units are mounted on the upper surface of the movable carriage and move therewith. The control and operation of these units will be described in detail hereinafter.

Mounting and structural details of the transfer means

Figures 4, 7, 8, 9:
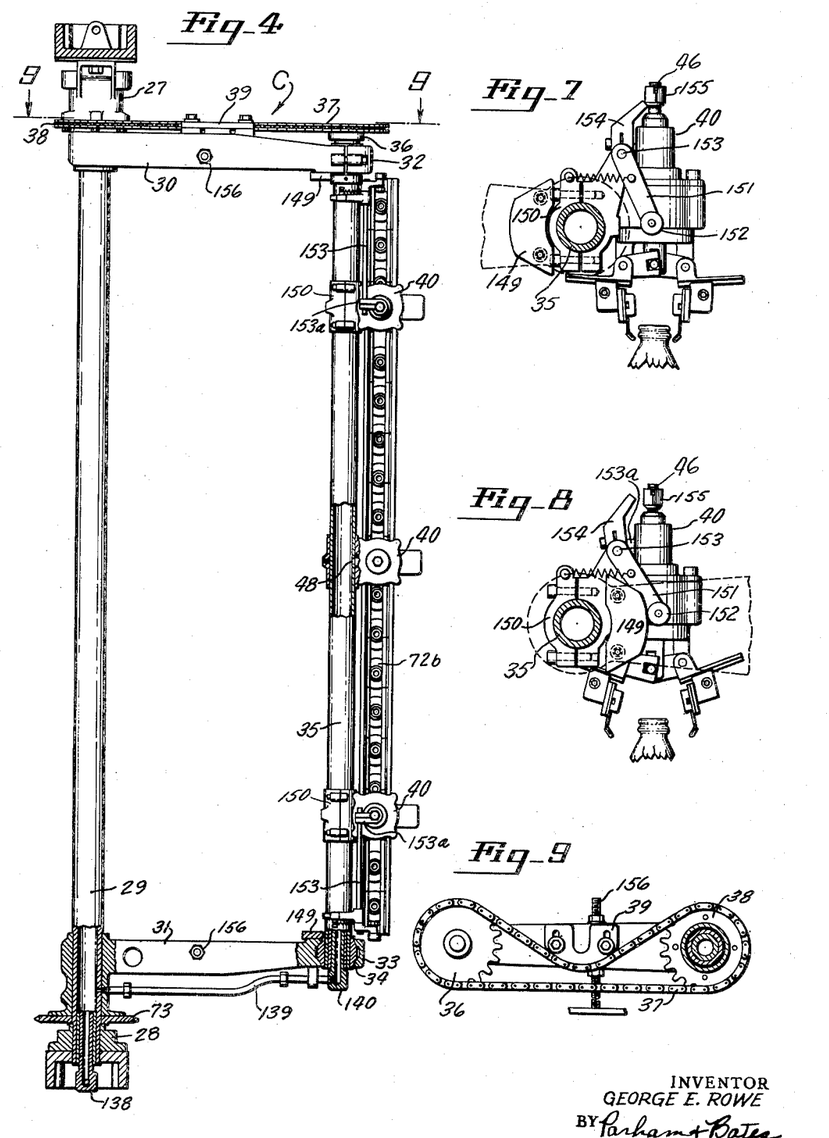
Fig. 4 is a plan view of the transfer means shown in Fig. 3, certain parts being broken away to reveal the details of construction of portions thereof.
Fig. 7 is a view of the gripper mechanism in a container-releasing position at the delivery station.
Fig. 8 is a view of the gripper mechanism in position prior to gripping containers at the receiving station.
Fig. 9 is a view of the transfer means taken on line 9—9 of Fig. 4, the view showing a chain-and-sprocket arrangement by which the axes of the containers being transferred are maintained vertical at all times.

A pair of rigid depending members 26 are secured to projections 15 of carriage 14 and are movable therewith. Secured to one of the depending members is a bearing support housing 27 and secured to the other depending member is a bearing unit 28. See Fig. 1. Pivotally supported therebetween for limited rotational movements is a horizontally disposed shaft 29 which is hollow as shown in Fig. 4. Secured thereto for rotation therewith are oscillatory arms 30 and 31. The outboard ends of these arms, which are of hollow construction, are split to form cap-and-yoke type clamps, as at 32 and 33, respectively, Fig. 4. These clamps support bearing members, such as member 34. Pivotally retained within the bearing members is a second hollow shaft 35 which is parallel to shaft 29. A sprocket 36 is secured to one end of shaft 35 and engages a roller chain 37 which, in turn, is engaged with a sprocket 38. This latter sprocket is secured to stationary bearing support housing 27 (see Figs. 4 and 9). A slack take-up plate 39 is adjustably secured to arm 30 for the adjustment of the slack in chain 37. The rollers of chain 37 roll on the edge of the plate and thus effectively reduce friction to a minimum. As arms 30 and 31 are moved in unison with shaft 29, chain 37, by means of its engagement with sprocket 38, acts to maintain shaft 35 in such a position that the shaft does not execute any rotation about its own axial center line.

Figures 5, 12:
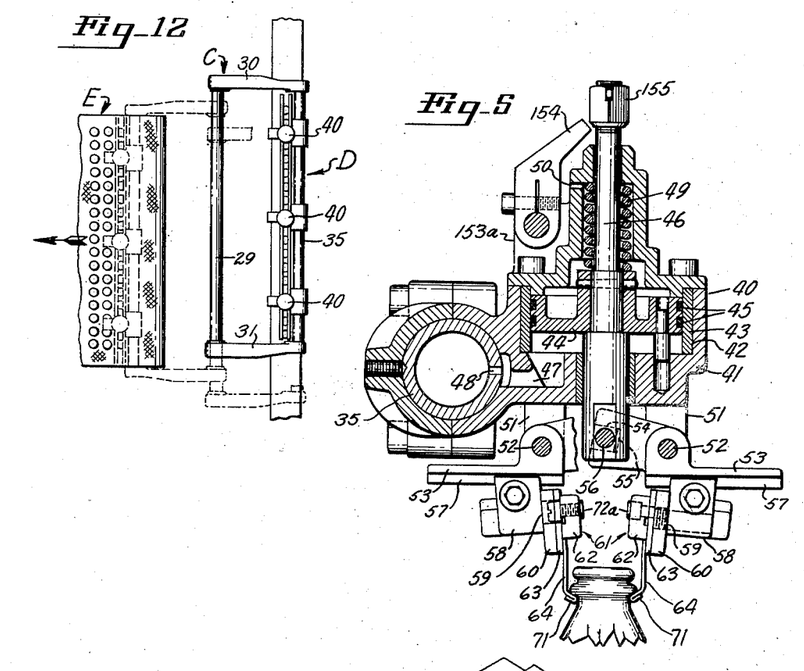
Fig. 5 is a relatively enlarged vertical section view of a pneumatic mechanism for actuating a pair of mounting bars and pluralities of associated gripper fingers by which the glass containers are grasped during the transfer thereof from the receiving station to the delivery station.
Fig. 12 is a diagrammatic view, showing by full and phantom lines the transfer means in various positions which such means may occupy at different times.

Three pneumatic gripper actuating mechanisms 40, the details of which are shown in Fig. 5, are clamped at evenly spaced intervals along shaft 35. Referring to Fig. 5, each such mechanism comprises a cylinder housing 41 formed to define a bore 42 therein within which is inserted a replaceable liner 43. Positioned for axial movements within liner 43 is a guided piston 44, provided with conventional piston rings 45, which is secured to a vertical piston rod 46 which extends above and below the level of the piston. A fluid conveying passage 47 is formed within housing 41 and communicates with a port 48 in shaft 35 and with the lower portion of bore 42.

Concentric with the upper portion of piston rod 46 is a spring 49 positioned to yieldably resist upward movements of piston 44. A vent hole 50 may be provided in an upper portion of the cylinder housing to vent the space above piston 44 to the atmosphere at all times. A pair of depending ears 51 are provided on a lower portion of housing 41. Pivotally supported by ears 51 and associated pivot pins 52 are levers 53, two levers being provided on each gripper actuating mechanism. The inner ends of the levers are slotted at 54 and slideably retain shoes, one of which is shown at 55, Fig. 5. Pivot pin 56 is secured in piston rod 46 and engages both of the shoes. The outer members of levers 53 are dovetailed on their lower portions, as at 57, and engage dovetailed clamp blocks 58, the dovetails constituting guiding means for the adjustment of the clamp blocks outwardly and inwardly relative to the vertical center line of the piston rod.

The three gripper actuating mechanisms are aligned so that the vertical center lines of the piston rods of the mechanisms all lie within a common vertical plane (hereinafter called "the vertical plane of centers"). The clamp blocks of the gripper mechanisms are uniformly positioned with respect to this plane in such a fashion that all of the faces 59 of blocks 58 lie within two common planes evenly spaced on either side of the vertical plane of centers. Mounting bars 60, of a length slightly shorter than the length of shaft 35, are secured to faces 59 of the clamp blocks and form the supports to which gripper finger assemblies, generally designated 61, are secured.

When the lower portion of bore 42 of each gripper actuating mechanism is pressurized by compressed fluid fed thereto from the interior of shaft 35, the piston of each unit is forced upwardly, thereby raising the associated piston rod and swinging the dovetailed levers so as to bring the mounting bars 60 inwardly towards the vertical plane of centers. During such upward movements of the pistons, air may escape from the upper portion of bores 42 by way of vent holes 50. If the pressure should be released from the interior of shaft 35, fluid will flow from the gripper actuating mechanisms, thereby releasing the pressure acting on the lower faces of the pistons and thereby permitting a downward movement of the piston rods under the influence of springs 49. This downward movement will reverse the position of the dovetailed levers so as to swing the mounting bars 60 outwardly away from the vertical plane centers. During the raising and lowering movements of the piston rods, the shoes 55 slide in slots 54 and thus prevent any binding among the parts of the gripper actuating mechanisms.

Gripper Assemblies

Figure 6:
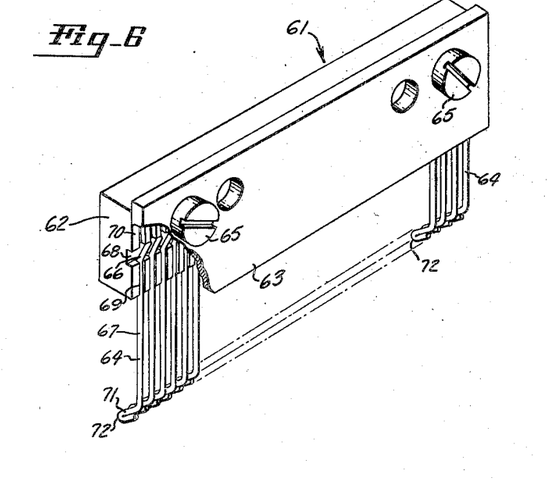
Fig. 6 is an enlarged perspective view of a gripper finger assembly, showing a plurality of gripper fingers secured in a preferred manner to the mounting bars of the mechanism shown in Fig. 5.

As shown in the enlarged perspective view of Fig. 6, each gripper assembly comprises a retainer bar 62 and a cover plate 63 between which a plurality of spring gripper fingers 64 are securely clamped by means of cap bolts 65. The spring fingers may be made from stainless steel wire or any other suitable, resilient, durable material. One end 66 of each gripper finger may be bent at an angle to body portion 67 of the finger. End 66 and the upper part of body portion 67 may be disposed in grooves 68 and 69, respectively, which are formed in face 70 of the retainer bar parallel to and transverse of the longitudinal axis, respectively, substantially as shown in Fig. 6. The positioning of the gripper fingers in the grooves, as described, effectively restrains any movement at the secured ends of the fingers relative to the retainer bar.

Lower end 71 of each gripper finger may be bent to form an obtuse angle with the main body portion 67. Part of the angularly disposed end 71 may be bent 180° and may be formed to be immediately adjacent to the adjoining portion. In this way, a rounded contact end 72 may be provided on the lower part of each gripper finger. The gripper assemblies may be attached to the inboard faces of the mounting bars by any conventional fastening means, such as 72a, Fig. 5. Sufficient gripper assemblies, butted end to end on each mounting bar, may be employed to provide cooperative sets of gripper fingers throughout substantially the full length of the mounting bars.

With the type of construction described, it is possible to replace gripper assemblies as units in case any of the spring fingers of particular gripper assemblies become damaged or worn.

The depending gripper fingers are spaced apart from each other, as shown in Fig. 1, sufficient gripper fingers being provided to grip or grasp a plurality of containers 72b by their neck portions.

The characteristics of the spring gripper fingers disclosed are of particular significance in the operation of the present device. It is noteworthy that the construction used affords a wide latitude of positioning of the articles not only with respect to the positioning of consecutive articles along the length of the mounting bars but also with respect to slight displacements of the articles from the vertical plane of centers. The gripper fingers described are capable of yielding laterally so as to conform to the finish portions of the articles being gripped regardless of the exact positioning of the articles and regardless of minor variations that may be present in the neck portions thereof. The yielding character of the spring fingers prevents the imposition of excessive pressures on any of the containers and thus prevents damaging thereof.

The spring gripper fingers have been disclosed and claimed in my co-pending application, Serial No. 705,371, filed October 24, 1946, now Patent No. 2,561,536, granted July 24, 1951.

Actuating means

Referring to Fig. 4, arms 30 and 31 and the parts carried thereby move as a unit in conjunction with shaft 29, so as to swing about the axial center line of the latter shaft between receiving station D and delivery station E. Swinging movements are imparted to these associated elements by means of a sprocket 73 which is secured to arm 31. Sprocket 73 is engaged by roller chain 74, one end of which is attached to piston rod 75. The piston rod is secured to piston 76 which is slideably retained for axial movements within a stationary cylinder 77, one end of which is vented to the atmosphere at 78. The other end of the cylinder may be fed with fluid under pressure by means of pipe 79, a part of which is shown in Fig. 3. The other end of chain 74 is secured to a turnbuckle 80 which, in turn, is secured to the lower end of a rod 81. The upper end of rod 81 is secured to a piston-like head 82 which acts to compress springs 83 against the lower end of a cylindrical housing 84 when a downward pull is applied to rod 81. The upper end of housing 84 is attached to one end of a short length of chain 85, the opposite end of the chain being secured to a pivot pin 86 which is fixed in a rotatable actuating arm 87. A spring-loaded, pivoted pawl 88 is secured to arm 87 and is positioned to engage a continuously rotating ratchet 89. Continuous rotation is imparted to the ratchet by a worm and worm wheel drive, generally designated 90. Operatively associated with this drive is a bevel gear 91 which is in mesh with and driven by another bevel gear 92, bevel gear 92 being secured to a horizontal drive shaft 93 to which is also secured sprocket 94 (see Fig. 1). A roller chain 95 engages sprocket 94 and imparts rotation thereto by virtue of its driven engagement with a variable speed drive motor unit, generally designated 96. As long as pawl 88 is in engagement with ratchet 89, continuous rotation is imparted to actuating arm 87. In accordance with this motion, pivot pin 86 describes a circular path about the center of ratchet 89 and imparts more-or-less harmonic movements to the upper end of chain 85. Fluid under constant pressure is applied to cylinder 77 at all times by means of pipe 79, thus providing a constant pull on piston rod 75 by virtue of piston 76. Thus, as actuating arm 87 continues to rotate, roller chain 74 drives sprocket 73, imparting to the arms 30 and 31 and their associated parts, an oscillatory motion through approximately 180°, the limit of possible motion being dependent upon the relative positioning of the receiving and delivery stations. Springs 83 act to cushion the driving action of the roller chain on sprocket 73 and further act as a safety device to prevent overloading of the roller chain. Thus, it will be apparent from the description of the foregoing mechanism that, during a part of the travel between the receiving and delivery stations, the oscillatory arms are driven alternately by the ratchet and by the pressurized cylinder 77, the motion at all times, however, being determined by the movements of rotatable actuating arm 87. Turnbuckle 80 may be used, if desired, to shift the angular location of the arc of oscillatory motion of the transfer means to compensate for differences of horizontal level of the receiving and delivery stations.

Referring to Fig. 3, it will be noted that pawl 88 is provided with a lobe or projecting end 97 which is positioned to engage a stop pin 98 (see Fig. 1). Stop pin 98 is associated with an air motor 99 of conventional design having a spring loaded member (not shown) slideably retained therein and secured to stop pin 98. When the air motor is pressurized with compressed fluid, pin 98 is retracted into the air motor. In the absence of such pressurization, the pin is forced outwardly under spring action to a position suitable for engagement with lobe 97 of the pawl. When so engaged, the pawl is rotated away from ratchet 89. Under this condition, no oscillatory motions are imparted to the actuating arms 30 and 31. However, should fluid pressure be applied to air motor 99, pawl 88 will be permitted to engage ratchet 89, thus permitting controlled movements of the oscillatory arms as hereinbefore described. The manner of pressurizing air motor 99 to effect a control of the movements of the oscillatory arms and related mechanism will be described hereinafter with reference to other control units of the present device.

Referring to Fig. 1, it will be noticed that the ratchet and related elements described above are mounted on the right-hand end of the device. On the left-hand end of the device, stationary mounting brackets 100 and 101 are rigidly attached to the movable carriage. Supported on these brackets for limited swinging movements about pivot pin 103 is an air cylinder 102. For part of its axial length, this pivot pin is hollow as shown at 103b and is fed with fluid under pressure from pipe line 103a which is associated therewith. Fluid under pressure may flow from pivot pin 103 by conventional internal passages to an external pipe line 104 by means of which compressed fluid is introduced beneath a member (not shown) which is slideably retained for axial movements within cylinder 102 and which is secured to a rod 105, the lower portion of which is shown depending from the cylinder. Attached to the lower end of rod 105 is a short length of roller chain 106 which is pivotally connected at 107 to arm 30. By means of the compressed fluid introduced by way of pipe line 103a, the lower portion of cylinder 102 is constantly maintained under pressure, an upward pull thus being imposed upon rod 105 and hence chain 106 at all times. This cylinder arrangement acts somewhat similar to a spring and, by the force constantly applied to chain 106 and hence to arm 30, acts to retard the arms during the latter portion of their travel towards both the receiving and delivery stations and assists in setting the arms into motion as they leave the receiving and delivery stations.

Control system and related mechanism

As shown in Fig. 1, a cam drum 108, having a plurality of regularly spaced circumferential grooves 109, is associated with worm drive 90 and is secured to a common shaft member to which rotatable arm 87 is also secured and is rotated when arm 87 is driven by ratchet 89. A plurality of actuating buttons 110 may be located at preferred positions along grooves 109. A bank of valves (hereinafter called a "valve bank"), generally designated 111, having associated actuating levers 112, operatively disposed to buttons 110, is supported above the cam drum. These valves are of a conventional poppet type and are well known in the glass art. The valves are of such a construction that, when actuated by an associated cam button, they feed compressed fluid to an associated pipe line. When not so actuated, the valves permit the exhaust of fluid from the associated pipe line to the atmosphere.

Any change of relative position between driven arm 87 and ratchet 89 when they are operatively connected is prevented by a holding pawl 113 mounted on the drum 108 and a ratchet 114 cooperative with the holding pawl in a conventional way.

Figure 10:
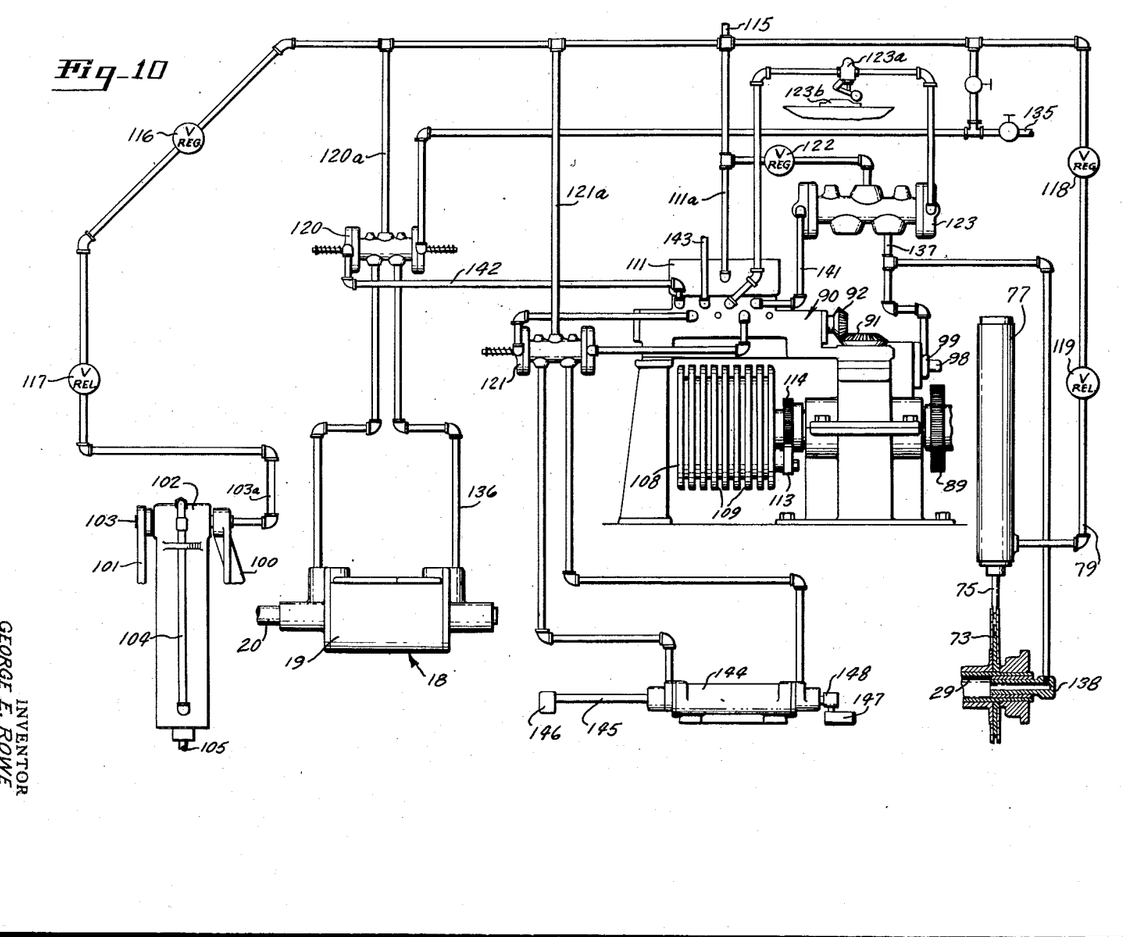
Fig. 10 is a schematic view of the piping arrangement which is used to convey fluid under pressure to various actuating and control units of the present device.
Figure 11:
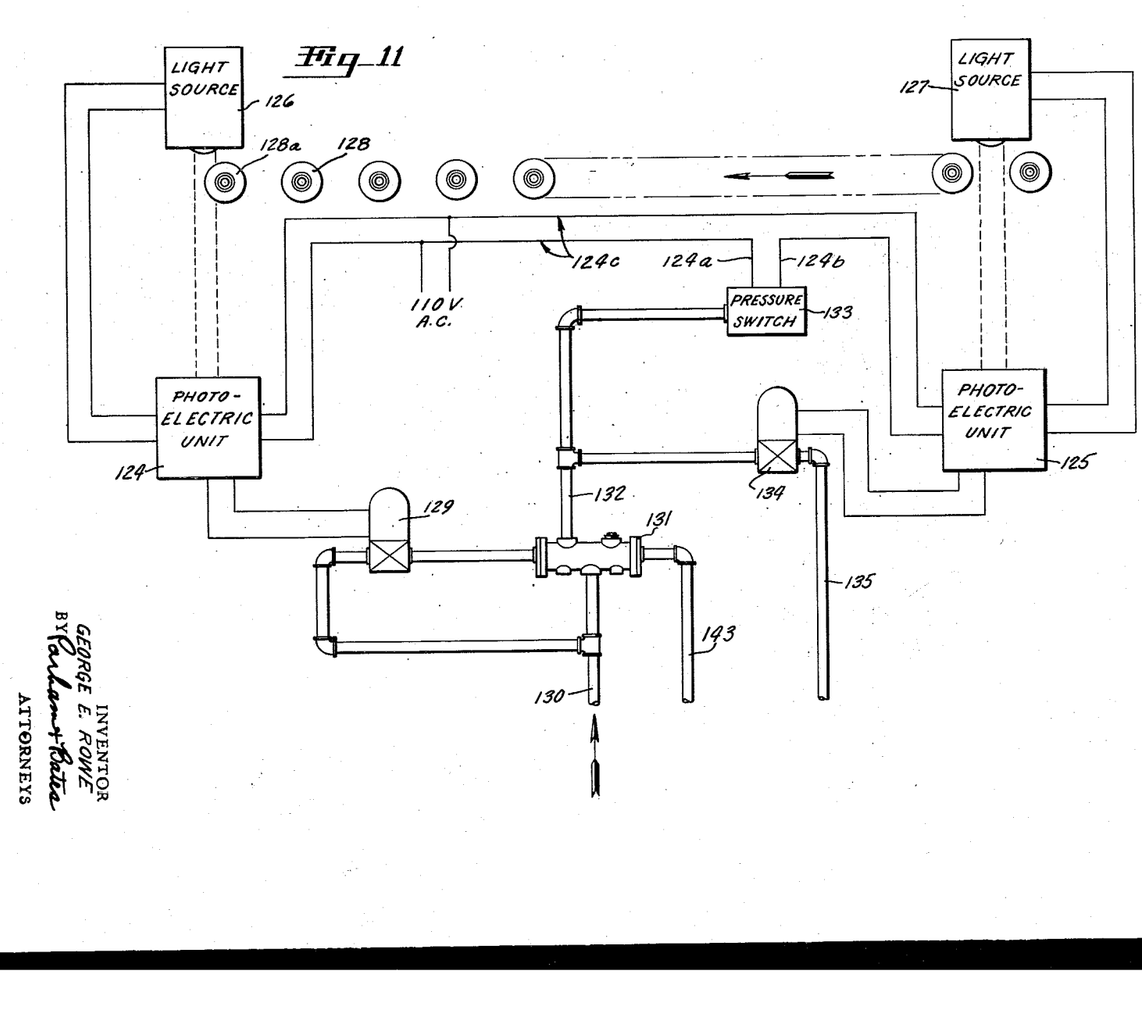
Fig. 11 is a schematic view of an electro-pneumatic control system, the function of which is to set the present device into operation to transfer containers from the receiving station to the delivery station.

The elements of the control system and associated equipment have been diagrammatically shown in Figs. 10 and 11. In the following description, the operation of the system will be described with reference to compressed air as an actuating fluid. However, it should be understood that the use of compressed air is a matter of preference and not limitation, other fluids under pressure being equally apposite to the operation of the present device. Compressed air may flow from incoming air line 115, Fig. 10, which is fed from a supply main (not shown), to a constant pressure regulator 116 and thereafter to relief valve 117, the latter two units regulating and maintaining a constant pressure in line 103a by means of which the compressed air is introduced to cylinder 102. In a similar manner, compressed air may flow from incoming air line 115 through regulating and relief valves 118 and 119, respectively, to pipe line 79 by means of which compressed air is introduced into cylinder 77. Pipe lines 120a, 121a and 111a convey compressed air from incoming line 115 to spool valves 120 and 121 and valve bank 111, respectively. After pressure regulation by regulating valve 122, compressed air is also fed to spool valve 123. Spool valves 120, 121 and 123 are commercially available units. These valves have two operating positions: when in one position, the valve will admit the flow of compressed air to one of two associated pipe lines and will permit the exhaust of air to the atmosphere from the second associated line; when in the second operating position, the line which was originally fed with compressed air will be vented to the atmosphere while the line previously exhausted will be fed with compressed air.

An electropneumatic control system, shown in Fig. 11, is associated with the control elements above described. This electropneumatic system comprises two photoelectric units 124 and 125 which are positioned to receive light rays from light sources 126 and 127, respectively. The photoelectric units are commercially available, those in the present embodiment being General Electric photoelectric units No. CR-7-505-K-100, combination A. Light source 126 projects a beam of light to unit 124 at all times. However, light source 127 is energized at intervals as will be described presently.

A row of containers 128 has been diagrammatically indicated as arriving at the receiving station by movement parallel to the length of the row. The containers of this row need not have any preferred spacing along the length thereof but may be more-or-less haphazardly spaced with varying air spaces between consecutive containers. As the leading container 128a of the row interrupts the beam of light being projected by unit 126, the circuit of photoelectric unit 124 is electronically tripped and acts to open the normally closed solenoid valve 129. The opening of valve 129 permits the passage of compressed air from incoming line 130 to the left-hand end of spool valve 131, left-hand referring to the position of the valve as shown in Fig. 11. The pressurization of the left-hand end of the spool valve shifts its operating position so as to admit a flow of compressed air from line 130 to branched pipe line 132 and thence to a pressure switch 133. Pressurization of the switch causes it to make an electrical connection between lines 124a and 124b and thereby completes an electrical circuit, generally designated 124c, that energizes photoelectric unit 125 and light source 127. Whereas photoelectric unit 124 is adjusted to be responsive to the interruption of its associated light beam, unit 125 is adjusted to be responsive to the impingement of light thereon. Thus, as soon as light source 127 has been energized by the closing of switch 133, light rays will be projected therefrom and will electronically trip photoelectric unit 125 as soon as the rays are permitted to pass thereto from between two consecutive containers of row 128 (see Fig. 11). The energization of unit 125 causes normally closed solenoid valve 134 to open, thereby permitting a flow of compressed air from line 132 to pipe line 135.

The above described electropneumatic control system is instrumental in setting the herein disclosed device into operation after an inactive dwell of the transfer means at the receiving station. The use of two photoelectric units accomplishes a two-fold purpose. First, the transfer means is not set into motion until a container has arrived at the extreme left-hand end of the receiving station. Secondly, photoelectric unit 125 may be positioned so that the transfer means will grasp and transfer an integral number of containers and will not grasp a part of the last container in the row to be transferred.

It is to be noted that, as shown in Fig. 10, pipe line 135 feeds compressed air to the right-hand end of spool valve 120. The ensuing shift of position of spool valve 120 admits the flow of compressed air from line 120a to line 136. From line 136, compressed air enters air motor 18 and, in a manner described hereinbefore, sets movable carriage B into motion. Attached to a side portion of carriage B and movable therewith is a normally closed cam-actuated air valve 123a. At a preferred point in the course of movement of the carriage, valve 123a comes into contact with and is opened by a fixed cam lobe 123b which may be releasably secured to any suitable portion of the stationary structure of the device. The opening of valve 123a permits a flow of compressed air from any suitable source, as from the valve bank, to the right-hand end of spool valve 123 and shifts its operating position to permit thereby a flow of pressure regulated air from line 115 to line 137. The valve of valve bank 111 associated with valve 123a may be held open for a relatively long time period by any suitable cam member, such as 123c, secured in the corresponding groove of cam drum 108 (see Fig. 1). The foregoing valve arrangement times the change of position of spool valve 123 to correspond to a given position of the carriage in the course of its motion. The compressed air introduced to pipe line 137 may flow by way of stationary adaptor 138 to the interior of hollow shaft 29 and thereafter to adaptor 140 by way of connecting pipe 139 (see Fig. 4). From adaptor 140, the compressed air may flow to the interior of hollow shaft 35 and thence to each of gripper actuating mechanisms 40. As explained in conjunction with Fig. 5, the pressurization of the gripper actuating mechanisms will cause the cooperative gripper fingers to grasp the neck portions of the containers at the receiving station.

Compressed air flows by way of pipe line 137 to air motor 99. As the air pressure builds up within the air motor, stop pin 98 will be retracted and pawl 88 will be permitted to engage ratchet 89. See Fig. 3. This engagement with the ratchet imparts rotation to actuating arm 87 and, by means of the related elements, swings the transfer means from the receiving station to the delivery station.

Immediately after the departure of the transfer means from the receiving station, compressed air is admitted by the valve bank to pipe line 143 and thence to the right-hand end of spool valve 131 (see Fig. 11), thus restoring the position of the spool valve to its initial position in preparation for the energization of photoelectric unit 124 by the next successive row of articles to be handled.

It is noteworthy that movable carriage B is traveling in a direction corresponding to the movement of the articles arriving at the receiving station at the time the gripper fingers grasp the articles to be handled. This movement of the carriage reduces the motion of the gripper fingers relative to the articles to be transferred and thereby tends to obviate the knocking over or dropping of the containers being grasped. It is also to be noted that the articles are securely grasped by the gripper fingers just as stop pin 98 is retracted to permit the swing of the transfer means from the receiving station to the delivery station. The combined motion of the carriage and transfer means avoids any interference between the transfer means and the containers arriving at the receiving station after the gripper fingers have grasped a row of containers to be transferred.

Inasmuch as the transfer means is in motion at the receiving station, as described, little or no impact results as the gripper fingers grasp the containers. By virtue of the harmonic nature of the motion imparted to the transfer means by the actuating means, the containers are gradually accelerated as they leave the receiving station and are gradually decelerated as they approach the delivery station. The lack of sudden impacts and accelerations is especially advantageous when the present device is used to transfer hot articles that may be in a soft, pliable state and easily distorted.

As the containers arrive at the delivery station, the valve of valve bank 111, associated with line 141, admits compressed air to the left-hand end of spool valve 123, thereby shifting its operating position to cut off the flow of compressed air to line 137 and to vent line 137 to the atmosphere. The release of pressure from line 137 permits the exhausting of the gripper mechanisms and the associated channels and passages which introduce air thereto and also permits the outward movement of the stop pin 98. The release of pressure from the gripper mechanisms permits the release of the containers being handled, the containers thus being deposited at the delivery station. During the latter portion of the return travel of the transfer means back towards the receiving station, compressed air is admitted to line 142 by the action of the associated valve of valve bank 111, the compressed air flowing to the left-hand end of spool valve 120, thereby shifting its operating position and reversing the action of air motor 18 to thereby return movable carriage B to its initial position.

Actuating arm 87 will continue to rotate in conjunction with ratchet 89 until lobe 97 engages stop pin 98 of air motor 99. See Fig. 3. By the time pawl 88 is disengaged from ratchet 89, the transfer means will have been returned to the initial position at the receiving station. When this occurs, the device will be restored in all respects to its initial operating position and will remain inactive at the receiving station until another row of containers to be handled arrives there and trips the units of the electropneumatic control system, after which the before described cycle of operations will be repeated.

Spool valve 121 controls the operation of stationary air motor 144 and may be connected thereto to feed compressed air to the right or left-hand end thereof to move rod 145 to the left or right, respectively, as desired. The operation of spool valve 121 is controlled by the opening and closing of associated valves of valve bank 111 as actuated by the related valve actuating buttons of the cam drum. A stop member 146 is adjustably secured to the left-hand end of rod 145. A pusher bar 147 is adjustably secured by conventional means 148 to the right-hand end of the same rod. As shown in Fig. 3, motor 144 may be positioned at the delivery station and may be disposed so that pusher bar 147 is in position to the left of the articles being deposited at the delivery station at the time rod 145 is in its extreme left-hand position. After a row of containers has been deposited at the delivery station and before the arrival there of the next row of containers, pusher bar 147 may be moved towards the right so as to sweep before it any containers from the previous row deposited that may have fallen over. In this way, it is certain that each new row, deposited at the delivery station, will meet with no undesirable interference.

When the herein disclosed device is used to transfer wide-mouthed ware which is to be closely stacked at the delivery station, positive stop means may be provided to prevent the gripper fingers from opening to such an extent that the adjacent row of containers will be knocked over. For this purpose, stationary cam plates 149 may be secured to the inboard faces of arms 30 and 31, Fig. 4. Support brackets 150 may be clamped to shaft 35 in a position adjacent to the cam plates. See Figs. 7 and 8. Spring-loaded cam levers 151, carrying cam rollers 152, may be disposed for cooperation with cam plates 149. Pivot rods 153, to which levers 151 may be secured, may be pivotally supported by brackets 150 and ears 153a, formed on an upper portion of the gripper actuating mechanisms. Stop fingers 154 may be secured to rods 153 for movement therewith and may be positioned for cooperation with stop nuts 155 which may be adjustably secured to the upper ends of vertical piston rods 46. Fig. 5 shows the positioning of a stop finger relative to a nut 155, prior to the release of a row of containers at the delivery station. Fig. 7 shows the relative positioning of the associated parts just as the row of containers is released. It is to be noted that, in Fig. 7, cam roller 152 is not in engagement with cam plate 149. Fig. 8 shows the positioning of the associated parts when the transfer means is at the receiving station prior to the gripping of a row of containers to be transferred. It is to be noted that in Fig. 8, cam roller 152 is in engagement with cam plate 149. This engagement imparts rotation to pivot rod 153, thereby swinging the stop finger away from the stop nut. When thus positioned, no interference of the associated parts can occur, and the piston rods of the gripper actuating mechanisms may be forced downwardly under spring action so as to separate the pluralities of spring gripper fingers to a relatively great extent.

*Over-all operation*

As shown in Fig. 3, the present device may be used in conjunction with a conventional conveyor unit at the receiving station and a conventional lehr at the delivery station although the type of conveyor or lehr used does not constitute a limitation of the present invention. The conveyor device used at the receiving station may be any one of a number of commercially available types, preferably a type that is capable of moving a plurality of articles in a row in a direction corresponding to the length of the row. The lehr at the delivery station may also be of any conventional type and may have a belt that moves in a direction normal to the longitudinal axis of the device and away therefrom. Inasmuch as the details of the receiving and delivery stations do not comprise any part of the present invention, they will not be described herein.

If desired, a stop screw 156 may be provided in each of the arms 30 and 31 to act as positive stop members to limit the motion of the arms towards the delivery station. See Figs. 4 and 9.

The over-all operation of the present device will now be considered. A row of containers is brought to the receiving station by means of the conventional conveyor apparatus. The arrival of the articles trips the electropneumatic control system and thus sets movable carriage B into motion, the transfer means thus being moved corresponding to the movement of the containers at the receiving station. While the transfer means is in motion, the cooperative gripper fingers close on the neck portions of the containers. Immediately thereafter, the transfer means is swung about the center line of shaft 29 over to the delivery station. At all times in the course of the transfer of the containers, the axes thereof remain vertical. The articles are deposited at the delivery station by the opening of the gripper fingers. The transfer means is then swung back towards the receiving station and during the latter part of its travel, the movable carriage moves to restore the transfer means associated therewith to its initial position. The transfer means comes to rest at the receiving station with the spring gripper fingers separated in position to grasp another row of containers that may arrive subsequently. In the course of the deposition of the row of containers at the delivery station, the extent to which the gripper fingers are separated in releasing the containers is regulated by positive stop means. The positive stop means are rendered ineffective when the gripper fingers are at the receiving station. After each row of containers has been deposited at the delivery station and has been moved away from the present device by the lehr belt, pusher bar 147 is moved so as to clear away any articles that may have accidently fallen over. The pusher bar is retracted to its initial operating position before the arrival at the delivery station of another row of containers.

Referring to Fig. 12, it is to be noted that the present device may be adjusted to operate when articles, arriving at the receiving station, arrive from either of the two directions possible; that is, from the left or right-hand end of the device. As shown in Fig. 12, the transfer means may start from the position indicated by full lines or from the position shown in phantom lines at the receiving station and thereafter swing to the delivery station, the transfer means being indicated thereat by dash lines. The principal adjustment that should be made to accomplish this change in operation is the shifting of the feed lines running from spool valve 120 to the opposite ends of air motor 18. Such an interchange in position of these airlines will result in the movable carriage moving in the opposite direction immediately prior to the gripping of the articles at the receiving station.

In the light of the foregoing disclosure, it will be obvious to those skilled in the art that many modifications may be made in the disclosed device without changing its fundamental character. Details of construction herein disclosed should be understood to be by way of illustration rather than by way of limitation.

Having thus described my invention and its practical application, I claim:

1. In an article handling device for transferring articles from a receiving station to a delivery station, movable transfer means comprising a pair of cooperative gripper parts of sufficient extent in the direction of length of a substantially straight row of randomly spaced articles on a moving horizontal conveyor simultaneously to grasp a plurality of such randomly spaced articles at the receiving station, and control means to impart a predetermined cycle of movements to the transfer means, said control means being constructed and arranged to initiate said cycle only after the first and last articles of the plurality of articles to be transferred simultaneously are entirely within the confines of the transfer means.

2. An article handling device for transferring containers from a receiving station to a delivery station comprising a stationary framework, a cradle supported by said framework, a movable carriage supported by said cradle, guiding means on said cradle to guide said carriage, movable transfer means operatively associated with said carriage, said transfer means comprising a shaft pivotally secured to a portion of said carriage, a pair of oscillatory arms secured to said shaft, a second shaft pivotally secured to the outer ends of said arms, means secured to said second shaft to grasp said containers being transferred and means associated with said arms to maintain a preferred relationship between said means to grasp said containers and said arms, pneumatic actuating means to impart a cycle of movements to said carriage and transfer means, said cycle of movements comprising movement at the receiving station corresponding to the motion of articles arriving thereat and movement between the receiving station and delivery station, and control means to regulate the operation of said actuating means.

3. Apparatus as defined in claim 2 wherein said means to grasp said articles comprises a plurality of gripper actuating mechanisms, a pair of mounting bars operatively associated with and moved by said gripper actuating mechanisms, and pluralities of yieldable gripper means operatively associated with said mounting bars to grasp the containers being transferred.

4. Apparatus as defined in claim 2 wherein said means to grasp comprises clamping means and a plurality of depending parallel regularly spaced yieldable gripper members secured in operative relationship by said clamping means.

5. In a transfer device for grasping and transferring pluralities of articles by rows from a receiving station to a delivery station, a control system comprising a light source, a photoelectric unit positioned to receive light rays from said light source, said photoelectric unit positioned relative to the receiving station so that the light rays from said light source are interrupted by the first container of a row of containers arriving at the receiving station, a second light source energized by said photoelectric unit when the light rays from said first named light source are interrupted, a second photoelectric unit positioned to receive light rays from said second named light source, the light rays passing to said last named photoelectric unit from between consecutive articles of the row arriving at the receiving station, a plurality of electropneumatic and pneumatic elements operatively associated with said photoelectric units to regulate the operation of the associated transfer device, said photoelectric units being positioned relative to each other and to the receiving station so that the transfer device is constrained to grasp an integral number of articles of the row.

6. An article handling device for transferring successive plural numbers of articles, such as bottles, from a moving horizontal conveyor on which such articles are disposed in a row in randomly spaced adjacent relation to a delivery station spaced from the conveyor, comprising means to detect arrival of the leading article of a plurality of consecutive articles of such row at a predetermined place along the path of travel of the conveyor, other means to detect the arrival of the first space between consecutive articles of the row at a place spaced back along the path of the moving conveyor a distance corresponding to the length of the portion of the conveyor carrying such plurality of consecutive articles after arrival of said leading article has been detected by said first means at said first named place, and movable transfer means acting automatically in response to detection of said space between consecutive articles by said second named means to grasp the plurality of articles on the conveyor between said spaced places along the conveyor path simultaneously and to transfer them simultaneously from the conveyor to said delivery station.

7. An article handling device as defined by claim 6 wherein said first named means to detect arrival of said leading article at said first named predetermined place along the path of travel of the conveyor comprises a light source to direct light rays across said conveyor at said place and a photo-electric unit positioned at the opposite side of the conveyor at said place so that said light rays are interrupted by said leading article when it arrives at said place, said other means to detect the arrival of the first space between consecutive articles at said second named place along the path of the moving conveyor comprises a second light source energized by said photo-electric unit when the light rays from said first named light source are interrupted and positioned to direct light rays when energized across the conveyor at said second named place, a second photo-electric unit positioned to receive light rays from said second light source and to be actuated thereby, and means operatively connecting said second photo-electric unit to said movable transfer means to effect said actuation of the latter when said second photo-electric unit is actuated.

GEORGE E. ROWE.

REFERENCES CITED

The following references are of record in the file of this patent:

UNITED STATES PATENTS

| Number | Name | Date |
|---|---|---|
| 1,567,725 | Freese | Dec. 29, 1925 |
| 1,620,778 | Odom | Mar. 15, 1927 |
| 1,867,389 | Sylvester | July 12, 1932 |
| 1,878,156 | Lorenz | Sept. 20, 1932 |
| 1,888,440 | Waugh, Jr. | Nov. 22, 1932 |
| 1,979,763 | Olson | Nov. 6, 1934 |
| 2,096,264 | Schutz | Oct. 19, 1937 |
| 2,135,986 | Morton et al. | Nov. 8, 1938 |
| 2,334,174 | Clausen | Nov. 16, 1943 |